United States Patent
Asghari et al.

(10) Patent No.: US 9,065,844 B1
(45) Date of Patent: Jun. 23, 2015

(54) METHOD AND APPARATUS FOR MANAGING SEQUENTIAL PROCESSING OF MESSAGES

(71) Applicant: Sprint Spectrum L.P., Overland Park, KS (US)

(72) Inventors: Abdolreza Asghari, Santa Clara, CA (US); Ehtesham Khan, Santa Clara, CA (US); Michael Tsai, Cupertino, CA (US); James D. Kirby, San Mateo, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 211 days.

(21) Appl. No.: 13/900,052

(22) Filed: May 22, 2013

(51) Int. Cl.
*H04L 15/16* (2006.01)
*H04L 29/08* (2006.01)

(52) U.S. Cl.
CPC ..................................... *H04L 67/14* (2013.01)

(58) Field of Classification Search
CPC ....................................................... H04L 51/38
USPC .......................................... 709/204/205/206
See application file for complete search history.

(56) References Cited

U.S. PATENT DOCUMENTS

| | | | | |
|---|---|---|---|---|
| 8,694,041 B2* | 4/2014 | Denman et al. | ............... | 455/518 |
| 2011/0072144 A1* | 3/2011 | Fikouras et al. | ............... | 709/230 |
| 2013/0315230 A1* | 11/2013 | Li et al. | ........................ | 370/352 |

OTHER PUBLICATIONS

"SIP Configuration Guide, Cisco IOs Release 12.4T"—Cisco, Aug. 2012 http://www.cisco.com/c/en/us/td/docs/ios-xml/ios/voice/sip/configuration/12-4t/sip-12-4t-book.pdf.*

* cited by examiner

*Primary Examiner* — Randy Scott (57) ABSTRACT

A method and apparatus to help manage sequential processing of messages. When a layer of a protocol stack in a computing device encounters a need to transmit two or more messages in a particular sequence, the layer generates and pass to a next layer of the stack a composite message defining the two or more messages together, rather than sending the messages one by one to the next layer. With this process, the combination of the two or more messages may thus pass between and/or through layers of the stack, and a layer of the stack receiving the combination may then extract the messages individually from the combination and output the extracted messages in sequence as desired.

6 Claims, 7 Drawing Sheets

Fig. 7

METHOD AND APPARATUS FOR MANAGING SEQUENTIAL PROCESSING OF MESSAGES

BACKGROUND

Unless otherwise indicated herein, the materials described in this section are not prior art to the claims and are not admitted to be prior art by inclusion in this section.

A computing device arranged to engage in data communication may implement a protocol stack defining a sequence of logical layers for handling the communication. By way of example, to support signaling for setup and management of real-time packet-based media sessions such as voice over Internet Protocol (VoIP) sessions for instance, a computing device may implement a protocol stack that includes an application layer, a Session Initiation Protocol (SIP) layer (i.e., a session layer), and a line handler layer (e.g., a transport layer), each of which may comprise program instructions defining a procedure or set of procedures executable by a processing unit to carry out particular functions.

To set up a real-time packet-based media session with a remote network entity, for instance, these layers may work together to facilitate engaging in packet-based SIP signaling with the remote entity, which may include sending to the remote entity a session initiation request such as a SIP INVITE message, receiving in response from the remote entity a session acceptance such as a SIP 200 OK message, and then transmitting to the remote entity a session setup acknowledgement message such as a SIP ACK message, to complete setup of the session.

In particular, when the application layer seeks to set up a communication session with the remote entity, the application layer may generate and pass to the SIP layer an inter-process communication (IPC) carrying an action code defining a session initiation request. Upon receipt of that IPC, the SIP layer may then establish in memory of the computing device a context record for the session and generate and pass to the line handler layer an IPC carrying a SIP INVITE message. And upon receipt of that IPC, the line handler layer may then encapsulate the SIP INVITE in a transport header and output the resulting transport packet for transmission to the remote entity. (In practice, a network layer of the stack may then receive the transport packet, encapsulate the transport packet in a network header including source and destination IP addresses, and output the resulting IP packet for transmission via a physical layer to the remote entity.)

When the computing device then receives in response from the remote entity a packet encapsulating a SIP 200 OK message, the line handler layer may then extract the SIP 200 OK message and pass the SIP 200 OK in an IPC to the SIP layer, and the SIP layer may update the context record and pass to the application layer an IPC carrying an action code defining a session acceptance. Upon receipt of that IPC, the application layer may then generate and pass to the SIP layer an IPC carrying an action code defining a session setup acknowledgement, the SIP layer may responsively update the context record and generate and pass in an IPC to the line handler layer a SIP ACK message, and the line handler layer may encapsulate the SIP ACK in a packet header and output the packet for transmission the remote entity.

OVERVIEW

To facilitate robust processing, such a computing device may implement multiple instances of each layer of its protocol stack. In particular, while each layer may consist of a set of program logic defining functions of that layer, the computing device may essentially execute separate copies of that logic concurrently, each as a respective instance of the layer.

For instance, assuming an application layer consists of a set of program logic executable to carry out application layer functions such as those described above, the computing device may implement multiple instances of that application layer logic at once. Likewise, assuming a SIP layer consists of a set of program logic executable to carry out SIP layer functions such as those described above, the computing device may essentially implement multiple instances of that SIP layer logic at once. And assuming a line handler layer consists of a set of program logic executable to carry out line handler layer functions such as those described above, the computing device may essentially implement multiple instances of that line handler layer logic at once.

In practice, the computing device may be arranged to limit the number of such instances of each layer, and to distribute incoming IPCs among those instances for processing. In particular, the computing device may include an IPC manager module that functions to receive each IPC that is being passed to a given layer of the stack, and to distribute the IPCs among the instances of that layer in a round-robin manner for instance. Further, the computing device may support queuing of IPCs to be processed by individual instances of a layer, and each instance may process a single IPC from its queue at a time. Thus, as the IPC manager passes an IPC to a given instance of a layer, the IPC manager may place the IPC in the queue specific to that instance, and the instance may process the IPCs one by one from that queue.

With such an arrangement, however, the various instances of a given layer may have different waiting times for IPCs in queue, even if there are identical number of IPCs in each instance's queue. This difference in waiting time may result from it taking longer to process some IPCs than others, as some IPCs may require additional or more complex functions to be carried out. Unfortunately, however, this difference in waiting times may create a timing issue in processing of IPCs by a given layer and more generally in processing of messages by the computing device as a whole. In particular, in a scenario where the computing device needs to transmit certain messages in a specific sequence to a remote entity and where one layer of the stack passes respective IPCs for those messages in the required sequence to a next layer of the stack, it is possible that the next layer will ultimately receive and process those IPCs out of order, which may result in failure transmit the messages or in transmission of the messages out of order.

As a specific example of this, consider a scenario where the computing device needs to transmit to a remote entity, in order, a session acknowledgement message to complete setup of a session and then a directive to play certain media in that established session. In practice, an application layer of such a device may encounter this scenario and may responsively generate and pass to a SIP layer of the device a first IPC carrying an action code defining the session acknowledgement message and then generate and pass to the SIP layer a second IPC carrying an information message defining media to play in the established session.

Optimally, these IPCs would be processed in order by the SIP layer, so that the SIP layer would pass to a line handler layer of the device a SIP ACK (session acknowledgement) to be transmitted to the remote entity and would then pass to the line handler layer a SIP INFO (information message) to be transmitted to the remote entity, and the line handler layer would then sequentially output those messages in respective packets for transmission to the remote entity.

However, if the SIP layer has multiple instances with different wait times for IPC processing, it is possible that the second IPC from the application layer may be processed by an instance of the SIP layer before the first IPC from the application layer is processed by another instance of the SIP layer. As a result, when the SIP layer receives the information message for the session, the SIP layer may determine from a context record that the session is not yet established, since no session acknowledgement has been sent yet, and so the SIP layer may discard the information message. Alternatively, the SIP layer may responsively generate and pass a SIP INFO to the line handler layer before the SIP layer generates and passes a SIP ACK to the line handler layer, and the remote entity may end up receiving the SIP INFO before receiving the SIP ACK. As a result, the remote entity may similarly discard the SIP INFO message, since the session is not yet established. In either case, the result may be a failure to play certain media in the session, which could result in user experience issues.

As another example, a timing issue may arise in processing at the line handler layer of IPCs from the SIP layer. For instance, consider a scenario where the computing device has transmitted to a remote entity a SIP INVITE to request setup of a session and, before receiving from the remote entity a SIP 200 OK for that session, the computing device receives from another entity a SIP CANCEL requesting cancellation of the session setup. In that scenario, the SIP layer may generate and pass to the line handler layer a first IPC carrying a SIP ACK for transmission to the remote entity so as to properly complete setup of the session (as the remote entity would be waiting for the SIP ACK after having sent the SIP 200 OK), and the SIP layer may then immediately generate and pass to the line handler layer a second IPC carrying a SIP BYE message for transmission to the remote entity so as to tear down the just-established session.

However, due to differences in queue and processing time for various instances of the line handler layer, it is possible that the second IPC from the SIP layer may be processed by an instance of the line handler layer before the first IPC from the SIP layer is processed by another instance of the line handler layer. Consequently, the computing device may end up transmitting to the remote entity the SIP BYE before transmitting to the remote entity the SIP ACK, and so the remote entity may receive the SIP BYE for a session before the session has been established and may therefore discard the SIP BYE. As a result, the session with the remote entity may be established notwithstanding the request to cancel session establishment.

Disclosed herein is a method and apparatus to help avoid this type of problem and to thus better manage sequential processing of messages. In accordance with the disclosure, when a layer of a protocol stack in a computing device encounters a need to transmit two or more messages in a particular sequence, the layer may generate and pass to a next layer of the stack a composite message defining the two or more messages together, rather than sending the messages one by one to the next layer. With this process, the combination of the two or more messages may thus pass between and/or through layers of the stack, and a layer of the stack receiving the combination may then extract the messages individually from the combination and output the extracted messages in sequence as desired. Advantageously, by passing a combination of the messages to a given layer of the stack rather than passing the messages individually to separate instances of that layer, the timing issue noted above should not occur.

Accordingly, in one respect, disclosed is a method operable by a computing device to manage sequential processing of messages. In accordance with the disclosure, the method involves a first layer (i.e., any given layer) of a protocol stack within a computing device encountering a trigger to transmit two or more messages in a defined sequence, one at a time, from the computing device. Further, the method involves, in response to encountering the trigger, passing a combination of the two or more messages in the stack from the first layer to a subsequent layer of the stack. And the method then involves, at the subsequent layer, (i) receiving the combination of the two or more messages, (ii) extracting the two or more messages individually from the received combination, (iii) and outputting the extracted messages one by one for transmission of the extracted messages in the defined sequence, one at a time, from the computing device.

As a specific example of this, a representative method may involve a scenario where an application server may be arranged to engage in third party call control to set up and manage a real-time packet-based media session between a client (e.g., calling device) and a Multimedia Resource Function (MRF) (e.g., an interactive voice response unit, including an MRF controller and MRF processor), and the application server implements a protocol stack such as that described above.

In such a method, the server may receive a packet encapsulating a first SIP ACK message transmitted to the server from the client, and a line handler layer of the server may pass the underlying first SIP ACK message to a SIP layer of the server. Responsive to the first SIP ACK, the SIP layer may then pass to an application layer of the server a first action code that corresponds with the received SIP ACK, to indicate to the application layer that the client has acknowledged setup of the session.

Responsive to the first action code from the SIP layer, the application layer may then pass to the SIP layer a second action code that corresponds with a combination of (i) a second SIP ACK and (ii) a SIP INFO specifying media for the MRF to play out to the client device in the session. And responsive to the second action code, the SIP layer may then pass to the line handler layer a composite message carrying both the second SIP ACK and the SIP INFO.

Responsive to the composite message, the line handler layer may then (i) extract the second SIP ACK and the SIP INFO individually from the composite message, (ii) output the extracted second SIP ACK for transmission from the server to the MRF as part of setting up the session between the client and the MRF, and (iii) after outputting the extracted second SIP ACK for transmission to the MRF, output the extracted SIP INFO for transmission from the server to the MRF to cause the MRF to play out the specified media to the client via the session between the client and the MRF.

In another respect, disclosed herein is a computing device, such as an application server, that includes a network communication interface configured to send and receive network communications, a processing unit, data storage, and program logic stored in the data storage and executable by the processing unit to carry out various functions described herein. For instance, the functions may include (i) detecting a trigger to transmit two or more messages in a defined sequence, one at a time, from the computing device, (ii) responsive to detecting the trigger, passing from a given layer of a protocol stack of the computing device to a subsequent layer of the protocol stack of the computing device a combination of the two or more messages, and (iii) receiving the combination of the two or more messages at the subsequent layer, extracting each of the two or more messages individually from the combination, and outputting the extracted messages in the defined sequence, one at a time, for transmission from the computing device. The network communication interface may thus transmit the extracted messages, one at a time, from the computing device to a destination.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Referring to the drawings, as noted above, FIG. 1 is a simplified block diagram of an example computing device 12 arranged to implement the disclosed method. As a general matter, the computing device may be any device that is arranged to process messages through a protocol stack, optimally to manage exchange of the messages with one or more other entities. By way of example and without limitation, the computing device may be a mobile phone, a personal computer, an application server, an MRF, or any other type of computing device now known or later developed. Further, the computing device may range in degree of size and complexity, not limited to the specific arrangement shown.

Figure 1:
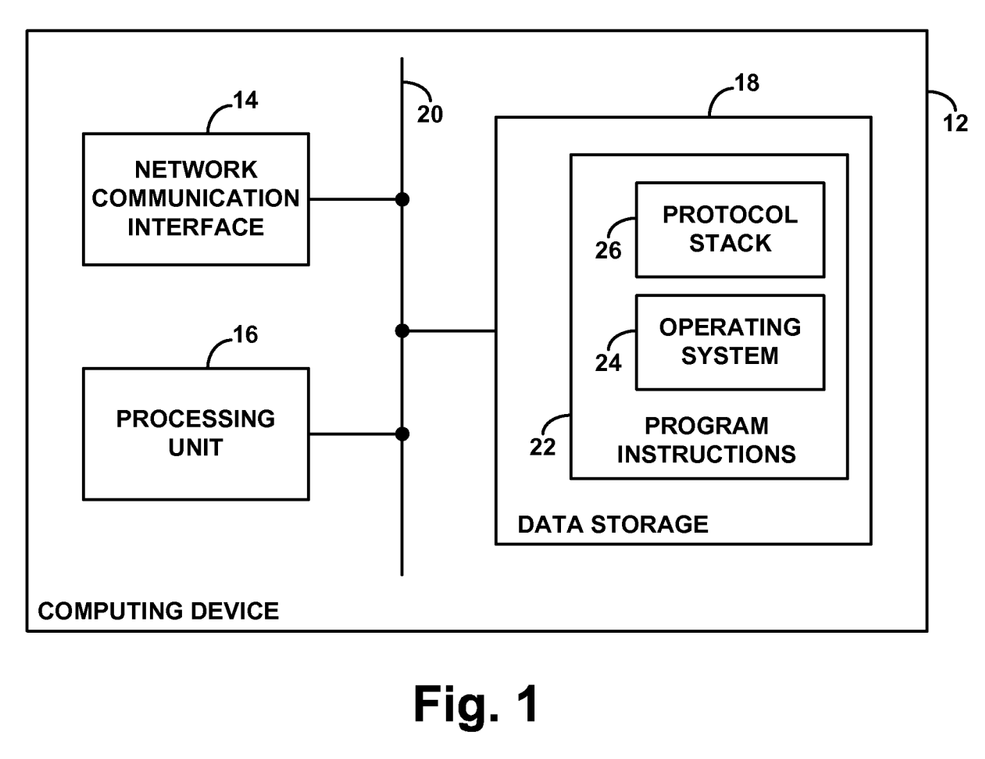
FIG. 1 is a simplified block diagram of an example computing device arranged to implement the present method.

In the arrangement shown, the computing device includes a network communication interface 14, a processing unit 16, and non-transitory data storage 18, all of which may be integrated together in various ways or communicatively linked together by a system bus, network, or other connection mechanism 20.

Network communication interface 14 functions to facilitate communication with various other entities via a network or other connection. As such, the network communication interface 72 may include one or more network interface modules, such as Ethernet network interface modules for example, or may take any of a variety of other forms, and may support wireless and/or wired communication. Processing unit 16 may then comprise one or more general purpose processors (such as microprocessors) and/or one or more special purpose processors (e.g., application specific integrated circuits) and may be integrated in whole or in part with network communication interface. Further, if processing unit 16 includes multiple processors, the processors may be arranged to work together to facilitate parallel processing or other enhanced functionality. And data storage 18 may comprise one or more volatile and/or non-volatile storage components, such as optical, magnetic, or flash storage, and may be integrated in whole or in part with processing unit 16.

In the example computing device, data storage 18 holds program instructions 22 executable by the processing unit 16 to carry out various functions described herein. In particular, as shown, the program instructions 20 include an operating system 24 and a protocol stack 26. In practice, the operating system manages interaction between the protocol stack and input/output components of the computing device such as the network communication interface 14. Thus, the network communication interface may receive communications from various other entities, and upon receipt of such communications, the processing unit 16 may execute the protocol stack to process the received communications. Likewise, as the processing unit executes the protocol stack to process outbound communications, the processing unit may pass those communications in turn to the network communication interface for transmission to various other entities.

As a general matter, the protocol stack 26 can take any of a variety of forms, having a sequence of layers each defined by a respective set of program logic defining one or more processes specific to the layer, and having an inter-layer manager for managing passing of IPCs between layers. Further, in a representative implementation as discussed above, the processing unit 16 may execute multiple instances of a given layer at substantially the same time and may support queuing of IPCs for processing by each instance.

A representative protocol stack may comply with the framework defined by the Open Systems Interconnection (OSI) reference model. Technically, the OSI stack includes seven layers, namely an application layer that supports end-user processes and high level application functionality, a presentation layer that manages the form of data such by providing encryption/decryption services, a session layer that manages application connections, a network layer that supports switching and routing of data through a network, a data link layer that manages encoding, framing, and other aspects of data being communicated, and a physical layer that defines the hardware for carrying the data between communication endpoints. In practice, the protocol stack 26 as defined by program instructions 20 might implement just the application layer through the data link layer, and hardware of the network communication interface may define or provide connectivity with the physical layer.

Figure 2:
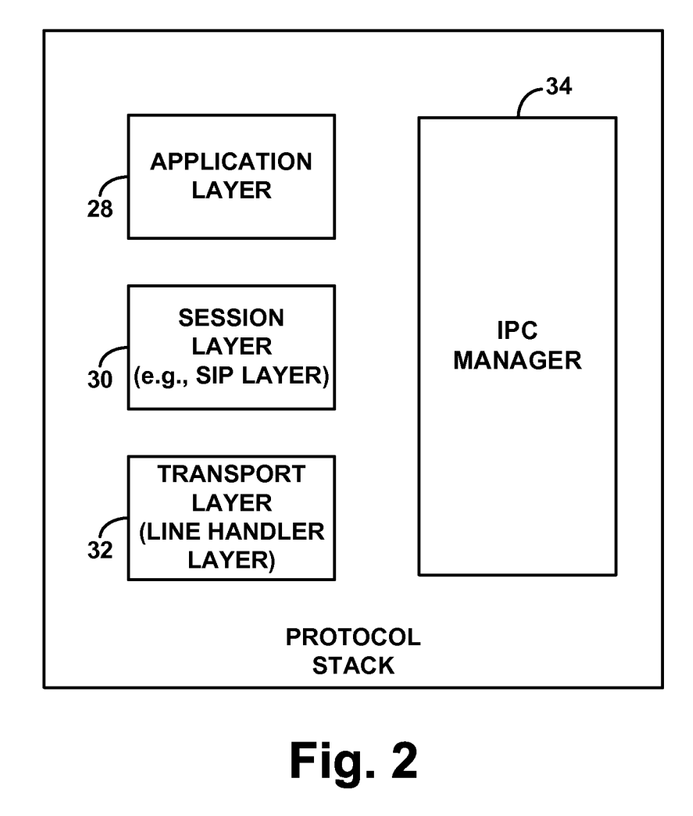
FIG. 2 is an illustration of a protocol stack executable by the example computing device.

The present method can be readily understood by considering operation of a simplified protocol stack, or representative layers of a protocol stack, as illustrated by FIG. 2. As shown in FIG. 2, the example protocol stack includes an application layer 28, a session layer 30, and a transport layer 32. In practice, the computing device at issue may be an application server as described above, in which case the application layer 28 may define logic for overseeing setup and management of sessions between a client and an MRF, the session layer 30 may be a SIP layer defining a back-to-back SIP user agent capable of engaging in SIP signaling with the client and with the MRF, and the transport layer may define a line handler layer configured to perform basic transport layer functions in accordance with Transmission Control Protocol (TCP) or User Datagram Protocol (UDP).

As discussed above, the protocol stack may also define an IPC manager 34 executable by the processing unit 16 to manage passing of IPCs between layers of the stack. In practice, for each layer that defines multiple instances, each instance may have a respective instance ID, and, in executing the IPC manager 34, as the processing unit receives each successive IPC destined for the layer, the processing unit may call a next one of the instances in a round robin fashion, putting the IPC in queue to be processed by the instance if the instance is currently processing another IPC. As discussed above, in executing a given instance of a layer, the processing unit may then process IPCs in the queue of that instance one at a time. In particular, the processing unit may process IPCs from the queue on a first-in-first-out basis.

For convenience in this document, various layers and other program logic are described as carrying out particular functions. In practice, it will be understood that those functions are not technically carried out by such program logic alone but, rather, may be carried out by the processing unit or the like executing the program logic or more generally by the computing device executing the program logic, to facilitate practical operation of the computing device.

Figure 3:
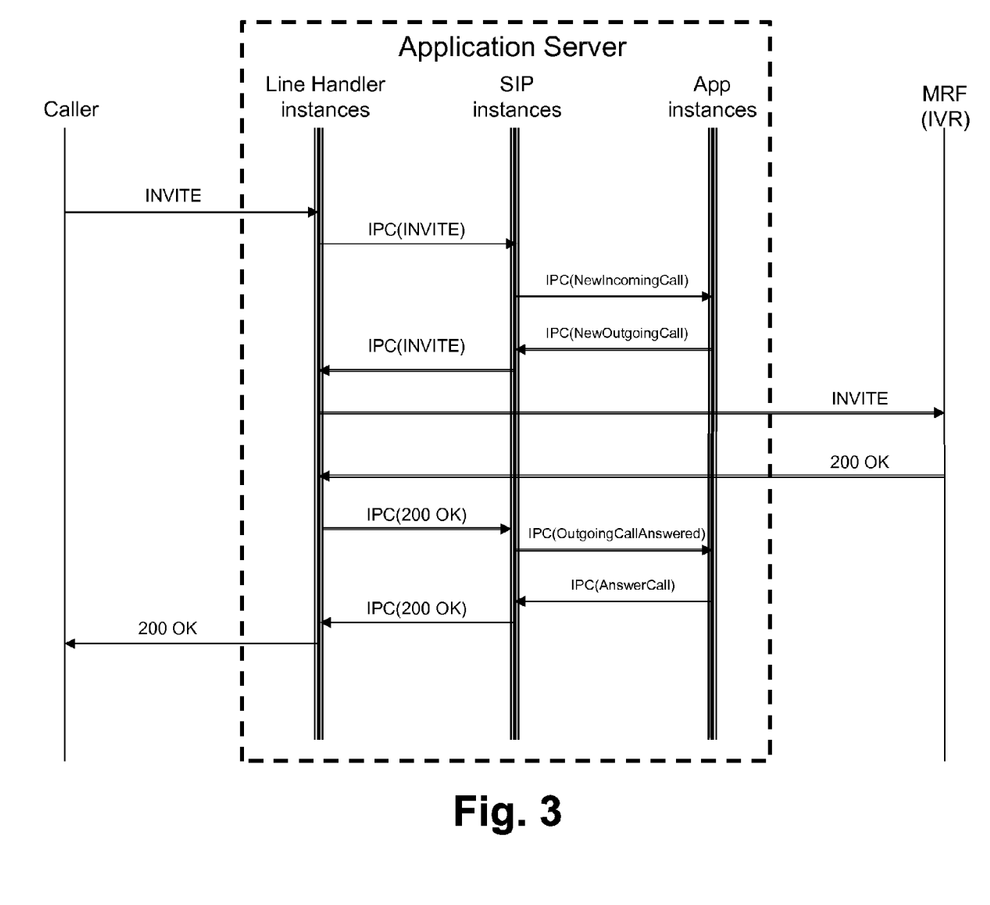
FIG. 3 is a message flow diagram depicting a portion of signaling in the example computing device.
Figure 4:
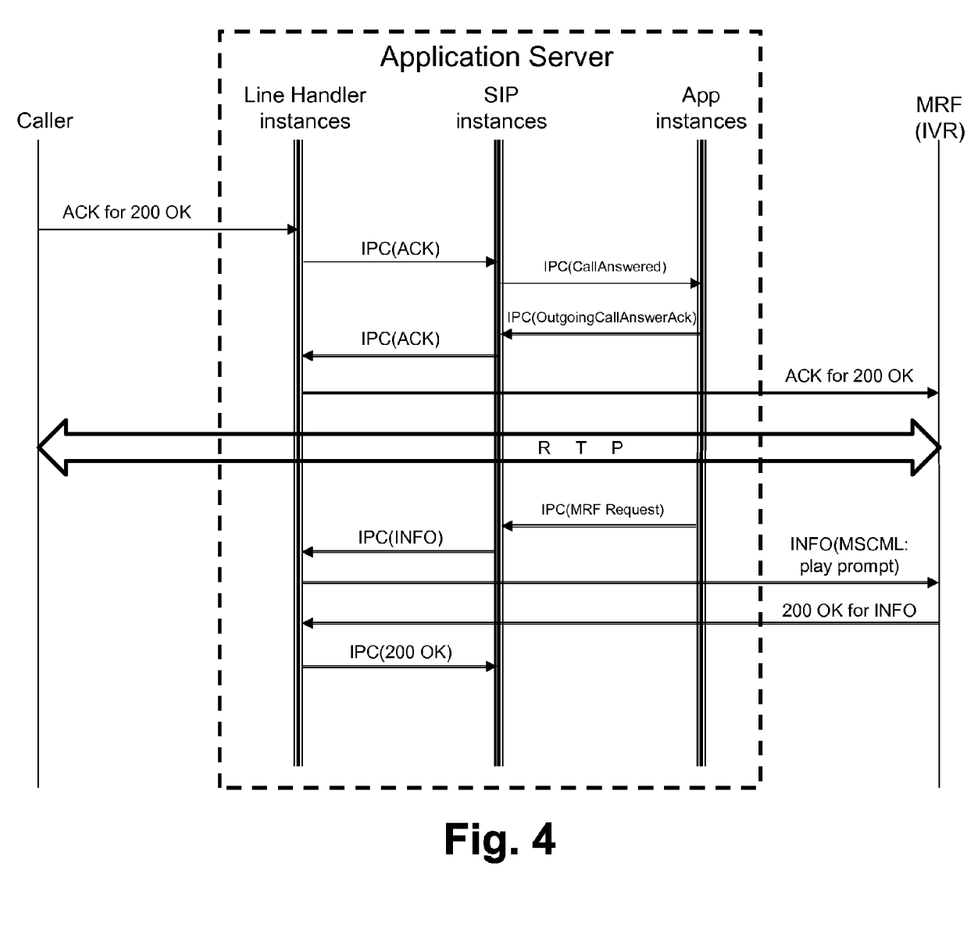
FIG. 4 is a message flow diagram depicting a first continuation of the signaling from FIG. 3, with signaling messages passed individually through the protocol stack.
Figure 5:
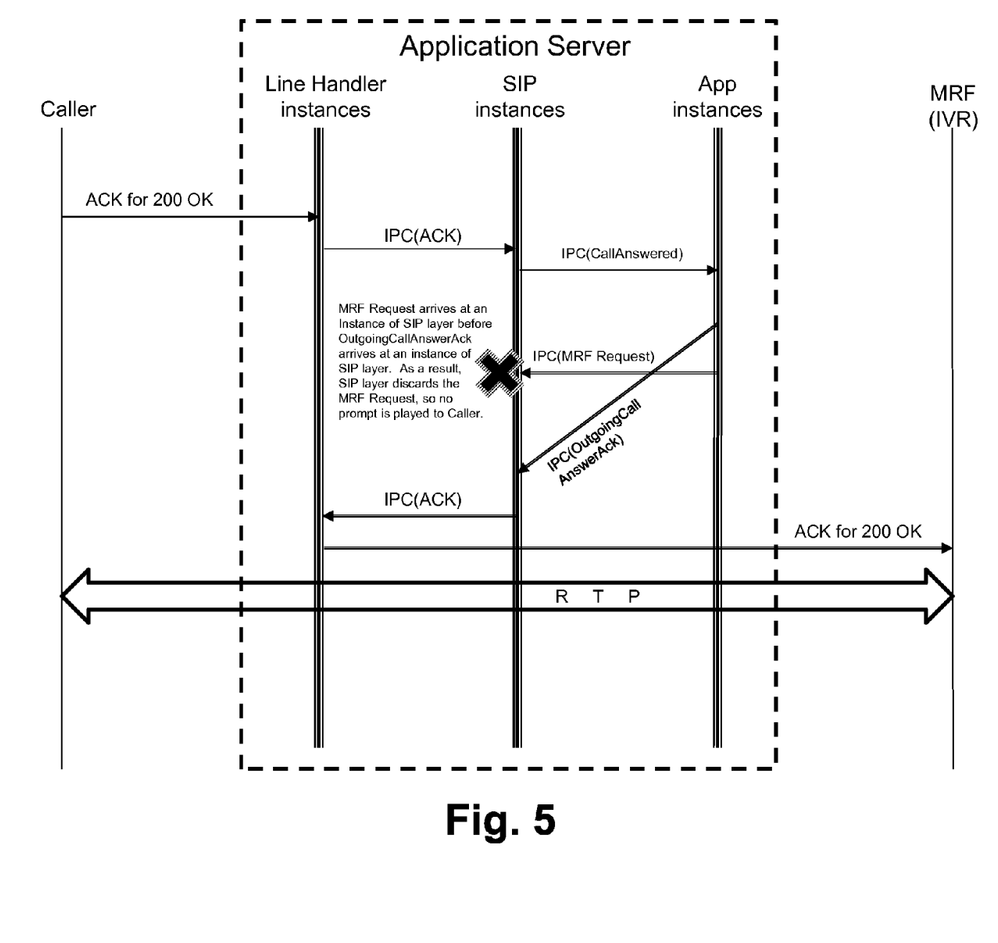
FIG. 5 is a message flow diagram depicting a second continuation of the signaling from FIG. 3, showing a timing issue that may arise with the process of FIG. 4.

FIGS. 3-6 are next message flows to help illustrate the present method by way of example, where the computing device at issue is an application server as described above. In particular, FIG. 3 illustrates a first portion of signaling related to set up of a real-time packet-based media session, such as an RTP session, between a caller (client device) and an MRF, and FIGS. 4-6 then depict alternate continuations from the signaling of FIG. 3. Specifically, FIG. 4 depicts signaling without the present method, FIG. 5 depicts an example timing problem that can arise in practice with the process of FIG. 5, and FIG. 6 then depicts improved signaling in accordance with the present method.

As shown in FIG. 3, the example process begins with the server receiving from the caller a packet containing a SIP INVITE requesting initiation of the session. The line handler layer then passes the underlying SIP INVITE in an IPC to the SIP layer, and the SIP layer responsively passes to the application layer an IPC carrying a corresponding NewIncomingCall action code. Upon receipt of that IPC, the application layer responsively passes to the SIP layer an IPC carrying a NewOutgoingCall action code, the SIP layer responsively passes to the line handler layer a corresponding SIP INVITE destined to the MRF, and the line handler layer then outputs the outgoing SIP INVITE in a packet for transmission to the MRF.

Upon receipt then of a packet containing a SIP 200 OK from the MRF, the line handler layer passes the underlying SIP 200 OK in an IPC to the SIP layer, and the SIP layer then responsively passes to the application layer an IPC carrying a corresponding OutgoingCallAnswered action code. Upon receipt of that IPC, the application layer then responsively passes to the SIP layer an IPC carrying an AnswerCall action code, the SIP layer responsively passes to the line handler layer a corresponding SIP 200 OK destined for the caller, and the line handler then outputs the SIP 200 OK in a packet for transmission to the caller.

At this point in the process, the caller has initiated the session, and the application server has worked to reach agreement with the caller and MRF to set up the session. What remains is then for the application server to receive a SIP ACK from the caller to complete setup of the session with respect to the caller and to send a SIP ACK to the MRF to complete setup of the session with respect to the MRF, and for the application server to then send to MRF a SIP INFO directing the MRF to play an initial prompt or other media in the session to the caller.

As shown next in FIG. 4, the process may thus continue with the application server receiving from the caller a packet containing a SIP ACK, the line handler layer responsively passing that SIP ACK to the SIP layer, and the SIP layer responsively passing to the application layer an IPC carrying a corresponding CallAnswered action code. In response, the application layer then passes to the SIP layer an IPC carrying an OutgoingCallAnswerAck action code, the SIP layer responsively passes to the line handler layer an IPC carrying a corresponding SIP ACK destined to the MRF, and the line handler layer outputs the SIP ACK in a packet for transmission to the MRF. This completes setup of an RTP session between the caller and the MRF.

In turn, as shown in FIG. 4, the application layer then passes to the SIP layer an IPC carrying an MRF Request action code, the SIP layer responsively passes to the line handler layer an IPC carrying a corresponding SIP INFO destined to the MRF and specifying (e.g., in media server control markup language) a prompt for the MRF to play to the caller, and the line handler outputs the SIP INFO in a packet for transmission to the MRF. The application server then receives from the MRF a packet containing a SIP 200 OK for the SIP INFO, and the line handler layer passes that 2IP 200 OK in an IPC to the SIP layer.

Referring next to FIG. 5, a potential problem with the process of FIG. 4 is that, even though the application layer passes the OutgoingCallAnswerAck IPC to the SIP layer before the application layer passes the MRF Request IPC to the SIP layer, the MRF Request IPC may arrive at an instance of the SIP layer before the OutgoingCallAnswerAck IPC arrives at the SIP layer. In particular, this may occur if the IPC manager happens to place the OutgoingCallAnswerAck IPC in an instance queue that has a sufficiently longer waiting period than the instance queue in which the IPC manager places the MRF Request IPC. Yet as noted above, the problem in this scenario is that the SIP layer instance that receives the MRF Request IPC may determine from a context record for the session that the session is not yet fully set up, since the final SIP ACK has not yet been sent to the MRF. Consequently, the SIP layer instance may responsively discard the MRF Request IPC. As shown in FIG. 5, the process would then continue with transmission of the SIP ACK to the MRF, to complete session setup. But in that scenario, the MRF would then not receive the SIP INFO and would thus not play the prompt to the caller, which could be a user experience problem.

Figure 6:
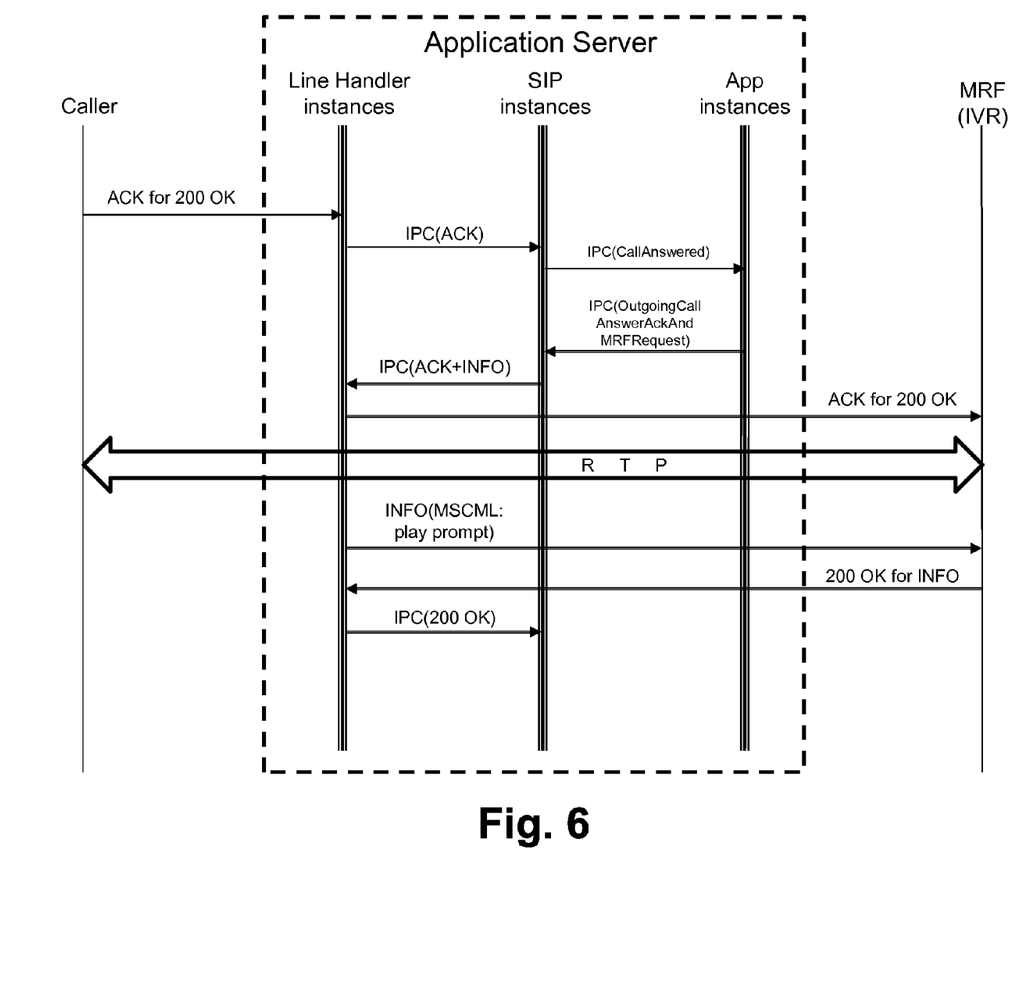
FIG. 6 is a message flow diagram depicting a third continuation of the signaling from FIG. 3, showing an improvement in accordance with the present method.

Turning next to FIG. 6, a solution to this problem in accordance with the present method involves passing the session acknowledgement and session information messages together through the protocol stack, to avoid the timing issue. In particular, as shown in FIG. 6, when the application layer receives from the SIP layer an IPC carrying the CallAnswered action code, the application server would conclude at that point that it will need to transmit to the MRF, in sequence, a SIP ACK followed by a SIP INFO specifying the prompt to play. Consequently, the application server may generate and pass to the SIP layer an IPC that represents a combination of those two messages, such as an IPC that carries an OutgoingCall-AnswerAckAndMRFRequest action code that the SIP layer is configured to interpret as a request to provide a combination of the SIP ACK and SIP INFO messages to the line handler layer.

Thus, when an instance of the SIP layer receives this composite IPC from the application layer, the SIP layer instance may then responsively generate and pass to the line handler layer an IPC carrying a corresponding combination of a SIP ACK and SIP INFO, for transmission to the MRF. In particular, the SIP layer may include in this single IPC to the line handler layer both the SIP ACK message and the SIP INFO message. Upon receipt of this composite IPC, the line handler layer may then responsively extract the individual SIP ACK and SIP INFO messages individually from the composite IPC and output them individually for transmission to the MRF.

Thus, as shown in FIG. 6, the line handler may extract the SIP ACK from the composite IPC and output the SIP ACK in a packet for transmission to the MRF, to complete setup of the session between the caller and the MRF. And the line handler layer may extract the SIP INFO from the composite IPC and, after having output the SIP ACK in a packet for transmission to the MRF, may output the SIP INFO in a packet for transmission to the MRF, to cause the MRF to play out the prompt in the established session.

Advantageously through this process, the timing issue at the SIP layer is avoided, because the session acknowledgement and session information messages are provided to the SIP layer together, rather than as separate messages that may be received and processed out of order by separate SIP layer instances. It will be appreciated that similar advantages can also result in processing other messages at the SIP layer and/or at other layers of a protocol stack.

Figure 7:
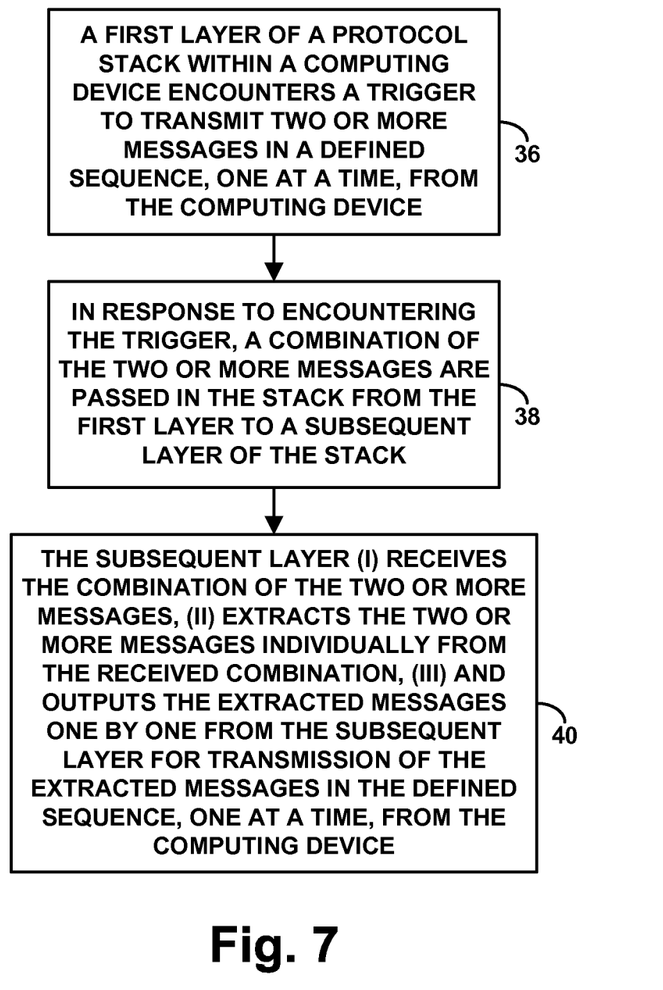
FIG. 7 is a flow chart depicting functions that can be carried out in accordance with the present method.

FIG. 7 is next a flow chart depicting functions that can be carried out in accordance with a representative implementation of the present method. As shown in FIG. 7, at block 36, a first layer of a protocol stack within a computing device encounters a trigger to transmit two or more messages in a defined sequence, one at a time, from the computing device. At block 38, in response to encountering the trigger, a combination of the two or more messages are passed in the stack from the first layer to a subsequent layer of the stack. In turn, at block 40, the subsequent layer then (i) receives the combination of the two or more messages, (ii) extracts the two or more messages individually from the received combination, (iii) and outputs the extracted messages one by one from the subsequent layer for transmission of the extracted messages in the defined sequence, one at a time, from the computing device.

As a specific example of this process, in line with the discussion above, the first layer may be an application layer of the computing device, so the application layer may encounter the trigger to transmit the two or more messages in the defined sequence, one at a time, from the computing device. The application layer may then pass the combination of messages in the stack to a middle layer such as a SIP layer (e.g., by passing an IPC carrying an action code that represents the combination of two or more messages), and the SIP layer may pass the combination of messages to a line handler layer as the subsequent layer (e.g., by passing an IPC carrying the two or more messages in respectively demarcated segments). (Note that the form of the combination of messages may change as the combination passes through the stack in this process.) The line handler layer may then receive the combination of messages and carry out the extracting and outputting of the messages for transmission (e.g., extracting each message from its demarcated segment and outputting the messages individually for transmission). Thus, the messages may be transmitted from the computing device in the defined sequence, one at a time.

As another example, the first layer may pass the combination of two or more messages more directly to the subsequent layer in an IPC from the first layer to the subsequent layer. For instance, this may occur where the first layer is the application layer is the first layer and the subsequent layer is the SIP layer, or where the first layer is the SIP layer and the subsequent layer is the line handler layer. Other examples are possible as well.

Exemplary embodiments have been described above. Those skilled in the art will understand, however, that changes and modifications may be made to these embodiments without departing from the true scope and spirit of the invention.

What is claimed is:

1. A method comprising:
receiving into a server a first Session Initiation Protocol (SIP) ACK message transmitted from a client, and passing the received first SIP ACK message from a line handler layer of the server to a SIP layer of the server;
responsive to the first SIP ACK, the SIP layer passing to an application layer of the server a first action code corresponding with the received first SIP ACK;
responsive to the first action code, the application layer passing to the SIP layer a second action code corresponding with a combination of (i) a second SIP ACK and (ii) a SIP INFO specifying media for playout to the client device;
responsive to the second action code, the SIP layer passing to the line handler layer a composite message carrying both the second SIP ACK and the SIP INFO; and
responsive to the composite message, the line handler layer (i) extracting the second SIP ACK and the SIP INFO individually from the composite message, (ii) outputting the extracted second SIP ACK for transmission from the server to a Media Resource Function (MRF) as part of setting up a real-time packet based media session between the client and the MRF, and (iii) after outputting the extracted second SIP ACK for transmission to the MRF, outputting the extracted SIP INFO for transmission from the server to the MRF to cause the MRF to play out the specified media to the client via the real-time packet-based media session between the client and the MRF.

2. The method of claim 1, further comprising:
transmitting the second SIP ACK from the server to the MRF; and
transmitting the SIP INFO from the server to the MRF.

3. The method of claim 1, wherein passing the first action code to the application layer comprises passing to the application layer a first inter-process communication (IPC) carrying the first action code, wherein passing the second action code to the SIP layer comprises passing to the SIP layer a second IPC carrying the second action code, and wherein the composite message carrying the second SIP ACK and the SIP INFO comprises a third IPC.

4. The method of claim 3, wherein the SIP layer defines multiple SIP layer instances, and wherein passing the second IPC to the SIP layer comprises passing the second IPC to a selected one of the SIP layer instances.

5. The method of claim 4, further comprising selecting the one SIP layer instance through a round robin process.

6. The method of claim 1, wherein the MRF functions as an interactive voice response unit, and wherein the real-time packet-based media session comprises a Real-time Transport Protocol (RTP) session.

* * * * *